United States Patent
Liebscher

(12) 
(10) Patent No.: US 6,646,704 B2
(45) Date of Patent: Nov. 11, 2003

(54) APPARATUS FOR PROJECTION UTILIZING LIQUID CRYSTAL LIGHT MODULATOR AND METHOD OF MANUFACTURING SAID LIQUID CRYSTAL LIGHT MODULATOR

(75) Inventor: Gerhard Liebscher, Boeblingen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 73 days.

(21) Appl. No.: 09/954,641

(22) Filed: Sep. 18, 2001

(65) Prior Publication Data

US 2002/0067442 A1 Jun. 6, 2002

(30) Foreign Application Priority Data

Sep. 18, 2000 (DE) .......................... 100 46 411

(51) Int. Cl.[7] ...................... G02F 1/1333; G02F 1/136; G02F 1/1335; H01L 29/04
(52) U.S. Cl. .................. 349/138; 349/43; 349/5; 257/59
(58) Field of Search ................ 349/5, 43, 138; 257/59, 72

(56) References Cited

U.S. PATENT DOCUMENTS

| | | | | |
|---|---|---|---|---|
| 6,344,888 B2 | * | 2/2002 | Yasukawa | 349/113 |
| 6,466,280 B1 | * | 10/2002 | Park et al. | 349/43 |
| 2001/0002144 A1 | * | 5/2001 | Yamazaki | 349/44 |
| 2002/0021378 A1 | * | 2/2002 | Murade | 349/43 |

FOREIGN PATENT DOCUMENTS

EP  0763765 A1  3/1997

* cited by examiner

Primary Examiner—Tarifur R. Chowdhury
(74) Attorney, Agent, or Firm—Steven R. Biren

(57) ABSTRACT

A liquid crystal light modulator projection apparatus and method of manufacturing the liquid crystal light modulator comprising a semiconducting substrate (1) with transistors (2) and control circuits, a light-reflecting layer (4), and a liquid crystal unit (7) which is embedded between a front plate (9) with a transparent covering electrode (8) and at least two pixel electrode (6), wherein each electrode (6) is connected to a transistor (2) via a contact hole (10) that traverses the light-reflecting layer (4), which itself comprises a thin insulating wall coating that facilitates the electrical insulation of the electrically conducting material inside the contact hole (10) from the light-reflecting layer (4).

7 Claims, 4 Drawing Sheets

APPARATUS FOR PROJECTION UTILIZING LIQUID CRYSTAL LIGHT MODULATOR AND METHOD OF MANUFACTURING SAID LIQUID CRYSTAL LIGHT MODULATOR

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION (1) Field of the Invention

The invention relates to a projection device with a liquid crystal light modulator, to a liquid crystal light modulator, and to a method of manufacturing a liquid crystal light modulator.

(2) Description of Related Art

Reflective liquid crystal displays do not require a background lighting as a light source because they are constructed such that light incident from the exterior is reflected within the liquid crystal display and thus serves as a light source for the display. To reflect the light, a reflective liquid crystal display comprises reflecting electrodes. Liquid crystal displays are used as light modulators in projection devices.

A liquid crystal light modulator comprises a thin layer of liquid crystal material arranged between a cover plate and a bottom plate. The cover plate usually consists of a glass substrate which comprises a large electrode on a surface adjoining the liquid crystal material. The bottom plate usually consists of a silicon substrate which achieves a coupling to the reflecting electrodes on a surface which adjoins the enclosed liquid crystal material.

The reflecting electrodes form a matrix arrangement of pixel electrodes and are each coupled to a thin-film transistor. The thin-film transistors are switched on and off by means of trigger circuits connected to the thin-film transistors. A voltage applied across the thin-film transistor at a pixel electrode varies the direction of orientation of the liquid crystal material at the pixel electrode, and the polarization plane of the light passing through the liquid crystal is modulated. If no voltage is applied to the pixel electrode, the light passing through the light modulator either remains unchanged, i.e. if the cells comprise helical nematic liquid crystal material, or it is scattered, i.e. if the cells comprise polymer-dispersed liquid crystal material.

Since a liquid crystal light modulator is exposed to an intensive irradiation with light, the electric circuits on the silicon substrate must be protected from this light in order to avoid light-induced currents. An important component of an effective liquid crystal light modulator, therefore, is a light-reflecting layer. Usually, the light-reflecting layer comprises a metal layer and is provided between the pixel electrodes and the transistors. A contact hole is created through the light-reflecting layer for providing an electrical contact between a pixel electrode and a transistor.

A liquid crystal light modulator is known from EP 0763765 A1. An insulating layer is provided between the pixel electrode and the light-reflecting layer in this liquid crystal light modulator for electrical insulation of the pixel electrodes and the light-reflecting layer of metal. The insulating layer is structured such that it envelops the regions of a contact hole which lie in the light-reflecting layer. Since the layer thickness of the insulating layer is a few micrometers, a region of a few micrometers arises around each contact hole where the light-reflecting layer is interrupted. Light passing the voids between the pixel electrodes is reflected against the light-reflecting layer and the lower sides of the pixel electrodes and will arrive at the silicon substrate through such an interruption in the light-reflecting layer.

BRIEF SUMMARY OF THE INVENTION

It is accordingly an object of the present invention to counteract the disadvantages of the prior art and to provide a projection device with an improved liquid crystal light modulator.

This object is achieved by means of a projection device fitted with a liquid crystal light modulator which comprises a semiconducting substrate on which transistor arrays and control circuits are provided, a first insulating layer provided on the substrate, a light-reflecting layer, a second insulating layer, at least two pixel electrodes, a liquid crystal unit, a cover electrode, and a front plate, wherein each pixel electrode is connected to a transistor through a contact hole which is filled with an electrically conducting material, and wherein the wall of the contact hole is fully covered with a third insulating layer.

It is advantageous if the third insulating layer has a layer thickness of between 100 nm and 500 nm.

Covering of the wall of a contact hole with an insulating layer whose layer thickness is at most 500 nm substantially reduces the size of the regions in which the light-reflecting layer is interrupted. The probability that light will pass through these regions and hit the semiconducting substrate is very small up to substantially non-existent.

It is preferred that the light-reflecting layer has at least one electrical contact to a transistor.

The electrostatic charge of the light-reflecting layer can be locally removed via the contact to a transistor.

The invention also relates to a projection device fitted with a liquid crystal light modulator which comprises a semiconducting substrate on which transistor arrays and control circuits are provided, a first insulating layer provided on the substrate, a light-reflecting layer, a second insulating layer, at least two pixel electrodes, a liquid crystal unit, a cover electrode, and a front plate, wherein each pixel electrode is connected to a transistor through a contact hole which is filled with an electrically conducting material, and wherein the wall of the contact hole is fully covered with a third insulating layer.

The invention further relates to a method of manufacturing a projection device fitted with a liquid crystal light modulator which comprises a semiconducting substrate on which transistor arrays and control circuits are provided, a first insulating layer provided on the substrate, a light-reflecting layer, a second insulating layer, at least two pixel electrodes, a liquid crystal unit, a cover electrode, and a front plate, wherein each pixel electrode is connected to a transistor through a contact hole which is filled with an electrically conducting material, in which method the wall of the contact hole is fully covered with a third insulating layer.

In contrast to the traditional manufacturing possibility for a contact hole, where a hole is etched through the first and the second insulating layer and through the light-reflecting layer, which hole is then filled with an insulating material, whereupon a second, smaller hole is etched into the insulating material and the second, smaller hole is filled with an electrically conducting material, it is possible by the method described above to create a layer on the wall of the contact hole which has clearly smaller layer thicknesses. The wide tolerances of the two photolithographic etching processes in the traditional manufacturing method have the result that the light-reflecting layer shows an interruption of a few μm around each contact hole in the prior art. In the method according to the invention, however, layer thicknesses in the nm range can be achieved.

It is preferred that the third insulating layer is provided on the wall of the contact hole through deposition of the third insulating layer on the second insulating layer and on the wall as well as on the bottom of the contact hole, and those regions of the third insulating layer which lie on the second insulating layer and on the bottom of the contact hole are etched away, for which the third insulating layer on the wall of the contact hole serves as a mask.

A further advantage of this method is that the use of the third insulating layer on the wall of a contact hole as a natural mask for the etching process simplifies the method.

It may be preferred that at least one transistor is exposed through etching before the light-reflecting layer is deposited.

It is advantageous that the electrical contact can be achieved in a simple process step, and that any number of transistors not used for controlling a pixel electrode can be connected to the light-reflecting layer.

DETAILED DESCRIPTION OF THE SEVERAL VIEWS OF THE DRAWINGS

DETAILED DESCRIPTION OF THE INVENTION

The invention will be explained in more detail below with reference to five Figures and two embodiments.

Figure 1:
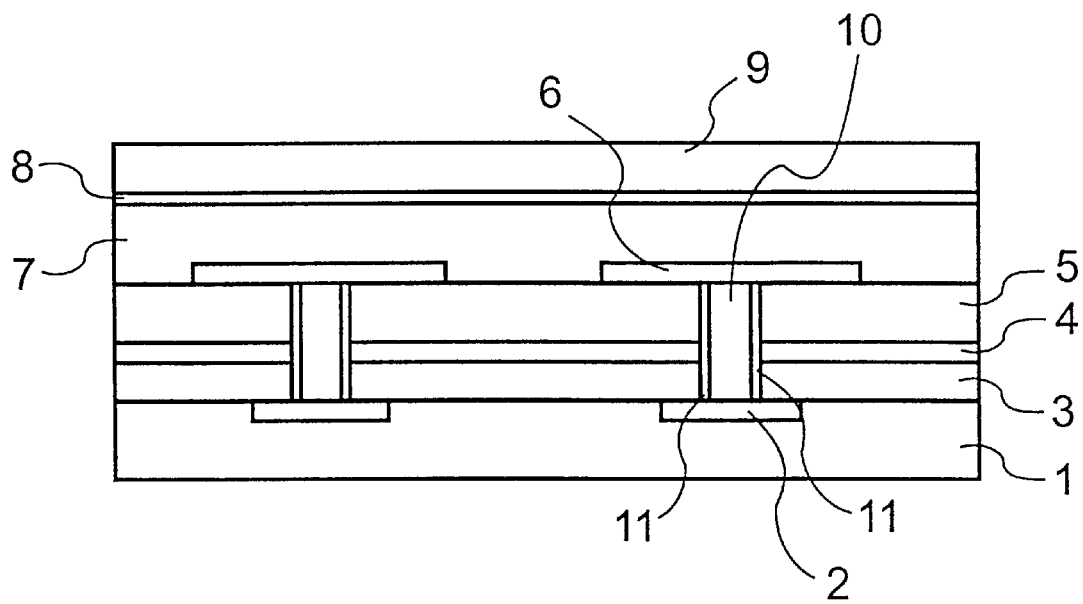
FIG. 1 is a cross-sectional schematic view of the construction of a liquid crystal light modulator according to an embodiment of the present invention.
Figure 2:
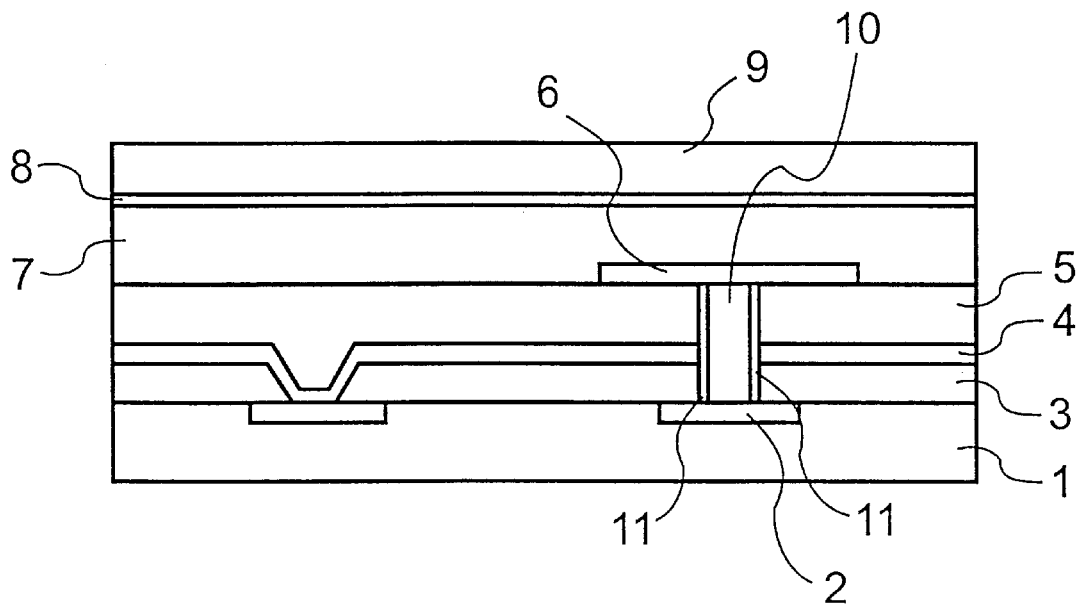
FIG. 2 is a cross-sectional schematic view of the construction of a liquid crystal light modulator according to an alternate embodiment of the present invention.
Figure 3A:
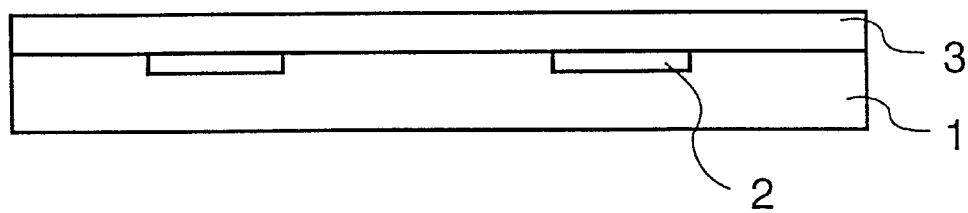
FIG. 3A is a cross-sectional schematic view of a step of the method of manufacture of a liquid crystal light modulator according to the present invention.
Figure 3B:
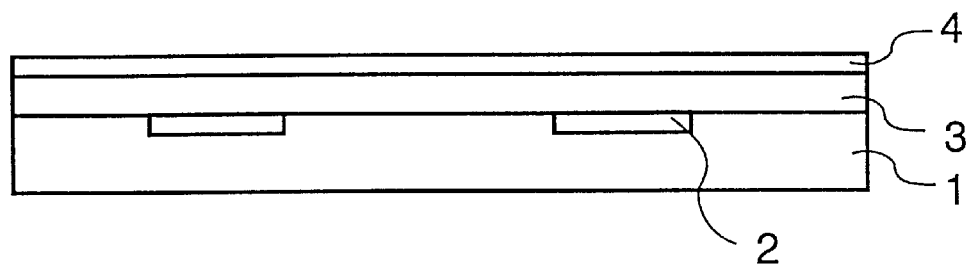
FIG. 3B is a cross-sectional schematic view of a step of the method of manufacture of a liquid crystal light modulator according to the present invention.
Figure 3C:
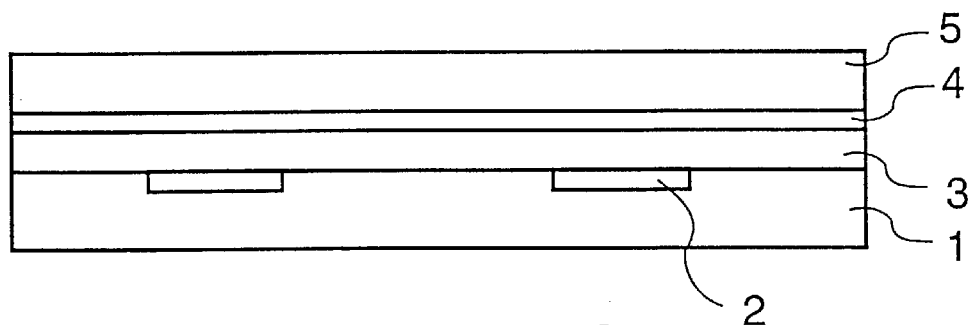
FIG. 3C is a cross-sectional schematic view of a step of the method of manufacture of a liquid crystal light modulator according to the present invention.
Figure 3D:
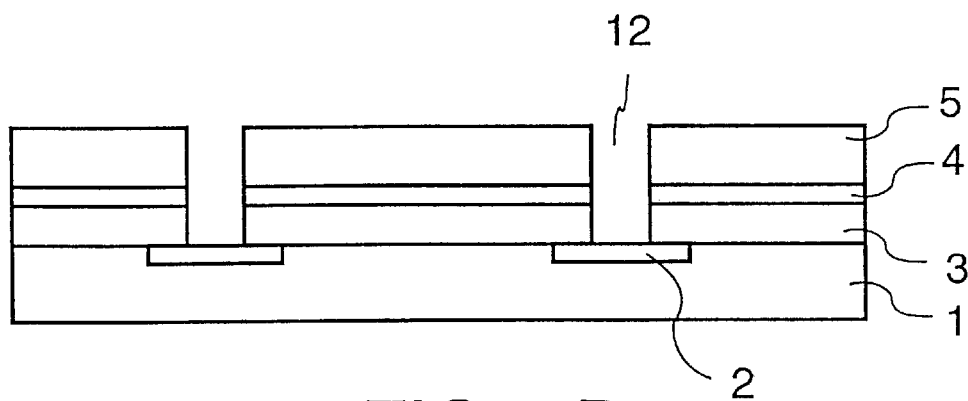
FIG. 3D is a cross-sectional schematic view of a step of the method of manufacture of a liquid crystal light modulator according to the present invention.

FIG. 1 and FIG. 2 each show the construction of a liquid crystal light modulator according to the invention, and FIGS. 3 to 5 show the manufacture of a liquid crystal light modulator.

In FIG. 1, a liquid crystal light modulator comprises a semiconducting substrate 1, preferably made of p-doped or n-doped silicon. Besides control circuits (not shown), transistors 2 are provided on the semiconducting substrate 1, which transistors are n-channel or p-channel transistors, in dependence on the type of semiconducting substrate 1. The transistors 2 are preferably thin-film transistors and each have a source, a gate, and a drain electrode. A first insulating layer 3, for example comprising $SiO_2$, $Si_3N_4$, $Ta_2O_5$, $Si_xO_yN$, ($0 \leq x \leq 1$, $0 \leq y \leq 1$, $0 \leq z \leq 1$), is provided on the semiconducting substrate 1. On the first insulating layer 3 lies a light-reflecting layer 4 which comprises, for example, Al, Ti, $Ti_xN_y$ ($0 \leq x \leq 1$, $0 \leq y \leq 1$), W, or Mo. A second insulating layer 5 is provided on the light-reflecting layer 4, and at least two pixel electrodes 6 are present on the second insulating layer 5. The pixel electrodes 6 reflect the incident light and comprise, for example, Al, Al doped with Si, Al doped with Si and Cu, Al doped with Cu, Al doped with Ge, or Al doped with Ge and Cu. On the pixel electrodes 6 lies a liquid crystal unit 7 which comprises, for example, TN (Twisted Nematic) liquid crystal molecules, GH (Guest Host) liquid crystal molecules, or PD (Polymer-Dispersed) liquid crystal molecules.

A front plate 9, for example comprising glass or a transparent synthetic substance such as polymethyl methacrylate, is provided on the liquid crystal unit 7. In addition, the front plate 9 comprises a top electrode 8 of a transparent, electrically conducting material such as, for example, ITO, on the side facing the liquid crystal unit 7.

Each pixel electrode 6 is connected to a transistor 2 via a contact hole 10. The wall of each contact hole is fully covered with a third insulating layer 11, and the contact hole 10 is filled with an electrically conducting material such as, for example, Al. The layer thickness of the third insulating layer 11 is preferably between 100 nm and 500 nm.

Materials which may be used for the second insulating layer 5 and the third insulating layer 11 are, for example, $SiO_2$, $Si_3N_4$, $Ta_2O_5$, $Si_xO_yN_z$ ($0 \leq x \leq 1$, $0 \leq y \leq 1$, $0 \leq z \leq 1$).

FIG. 2 shows an alternative embodiment of a liquid crystal light modulator according to the invention. The construction and the preferred materials are analogous to those of the liquid crystal light modulator of FIG. 1, except for the fact that the light-reflecting layer 4 is in direct electrical contact with a transistor 2 in at least one location.

Such a liquid crystal light modulator may be used, for example, in a projection device.

A possible embodiment of a color projection device comprises a light source which emits white light. The light is incident on a prism, where it is split up into its red, green, and blue spectral components by means of dichroic filter coatings. Each kind of colored light is guided to a respective liquid crystal light modulator. After reflection at the liquid crystal light modulators, the light waves move back through the prism and through a projection lens. The projection lens enlarges and projects the reassembled color picture on a projection screen. The projection device yields an improved picture owing to the improved liquid crystal light modulator.

FIGS. 3 to 5 show the manufacture of a liquid crystal light modulator. In FIG. 3A, a first insulating layer 3 is provided on a semiconducting substrate 1 on which transistor arrays and control circuits are present. A light-reflecting layer 4 is provided on the first insulating layer 3 (FIG. 3B), and a second insulating layer 5 is provided on the light-reflecting layer 4 (FIG. 3C). Then a cylindrical hole 12 is made through the second insulating layer 5, the light-reflecting layer 4, and the first insulating layer 3, whereby a transistor 2 becomes exposed (FIG. 3D). The cylindrical hole 12 may be created in a sputtering process, a plasma etching process, a physical-chemical dry etching process, or a chemical etchant solution.

Figure 4A:
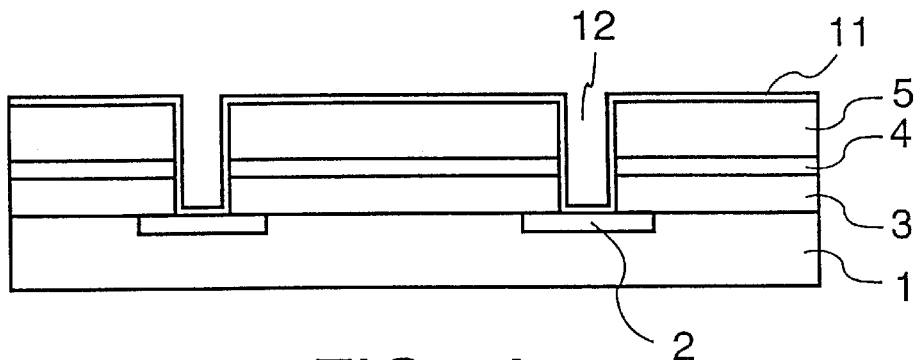
FIG. 4A is a cross-sectional schematic view of a step of the method of manufacture of a liquid crystal light modulator according to the present invention.
Figure 4B:
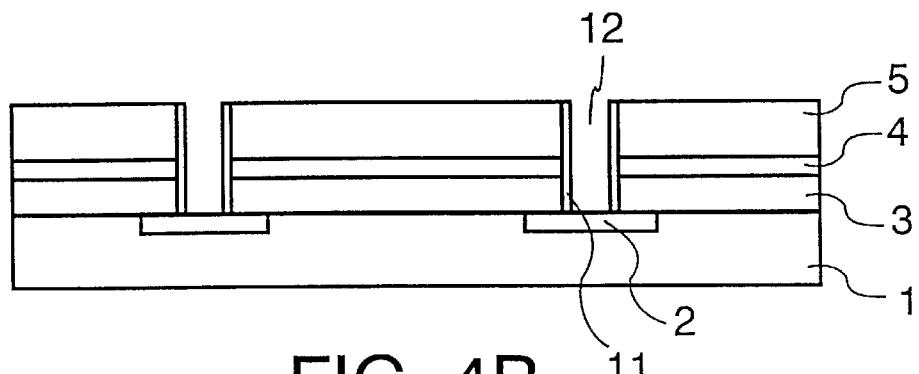
FIG. 4B is a cross-sectional schematic view of a step of the method of manufacture of a liquid crystal light modulator according to the present invention.
Figure 4C:
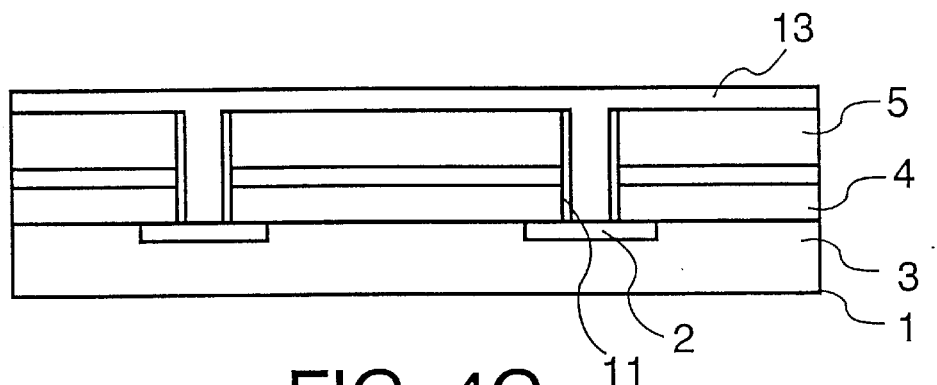
FIG. 4C is a cross-sectional schematic view of a step of the method of manufacture of a liquid crystal light modulator according to the present invention.
Figure 4D:
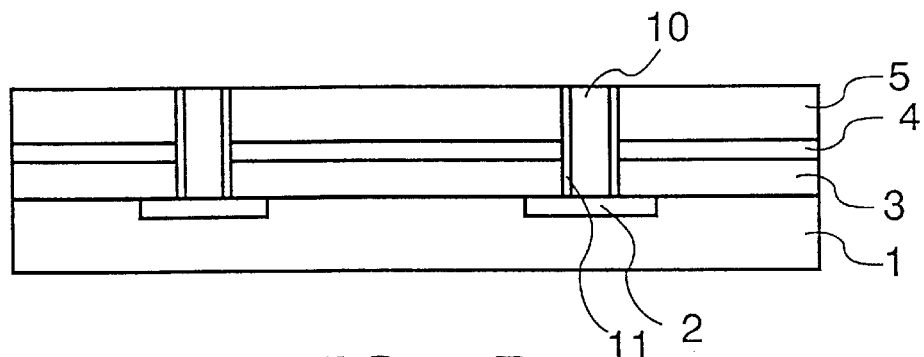
FIG. 4D is a cross-sectional schematic view of a step of the method of manufacture of a liquid crystal light modulator according to the present invention.

In the next step, see FIG. 4A, a thin, third insulating layer 11 is deposited on the second insulating layer 5 and on the wall and the bottom of the cylindrical hole 12. Those regions of the third insulating layer 11 which lie on the second insulating layer 5 and on the bottom of the cylindrical hole 12 are removed by etching (FIG. 4B). The third insulating layer 11 on the wall of the cylindrical hole 12 serves as a natural mask for the etching process here. Then the cylindrical hole 12 is filled with an electrically conducting material, for example Al. For this purpose, the layer 13 of the electrically conducting material is deposited over the surface of the second insulating layer 5 and in the cylindrical hole 12 (FIG. 4C). Subsequently, the electrically conducting material is removed from the second insulating layer 5, and a planar surface is created (FIG. 4D).

Figure 5A:
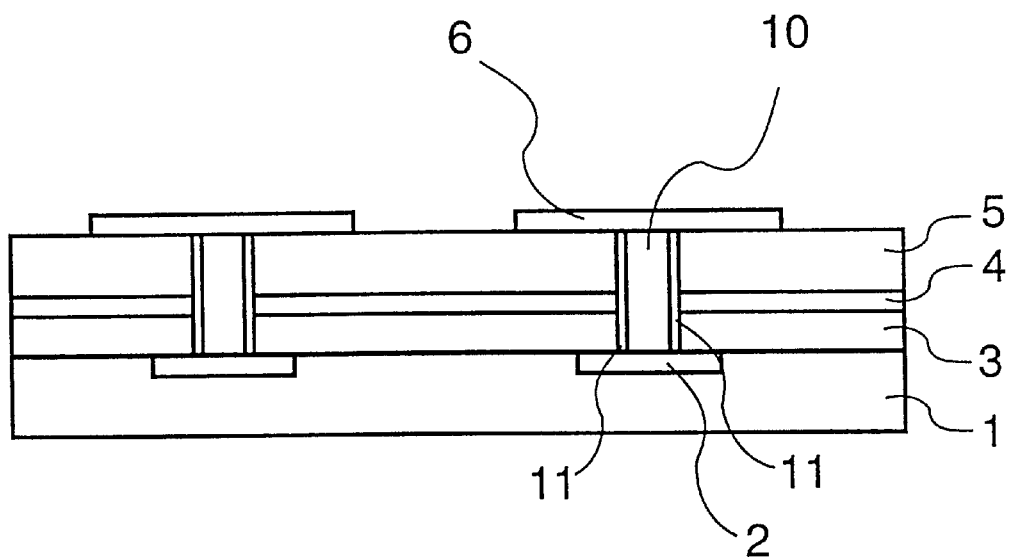
FIG. 5A is a cross-sectional schematic view of a step of the method of manufacture of a liquid crystal light modulator according to the present invention.
Figure 5B:
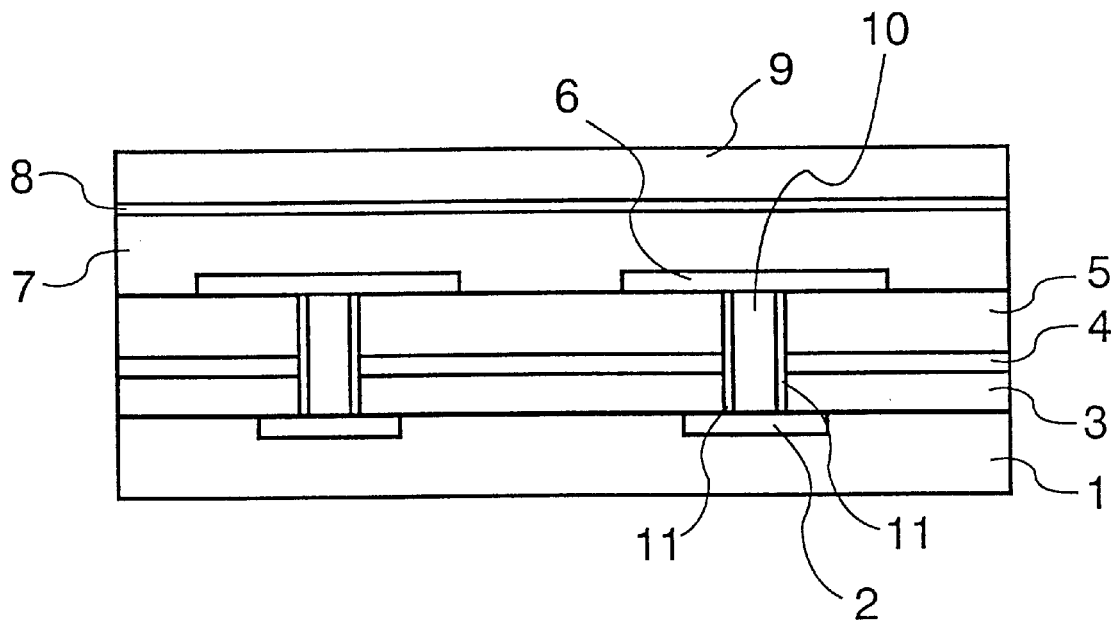
FIG. 5B is a cross-sectional schematic view of a step of the method of manufacture of a liquid crystal light modulator according to the present invention.

In FIG. 5A, a layer of a reflecting metal is then deposited, and this layer is structured into pixel electrodes 6 by means of etching. Structuring of the layer of reflecting metal is carried out such that subsequently each pixel electrode 6 is connected to a transistor 2 via a contact hole 10. Then a liquid crystal unit 7 and a front plate 9 comprising a transparent top electrode 8 are provided (FIG. 5B).

If the light-reflecting layer 4 is to be connected to a transistor 2 in several locations, it may be preferred that at least one transistor 2 is exposed through etching, i.e. through the removal of a small portion of the first insulating layer 3, before the light-reflecting layer 4 is deposited.

Embodiments of the invention will be explained in more detail below, representing examples of how the invention may be realized in practice.

Embodiment 1

Transistor arrays of n-channel transistors 2 and control circuits are provided on a semiconducting substrate 1 of p-doped silicon. On the semiconducting substrate 1 are present a first insulating layer 3 of $SiO_2$, a light-reflecting layer 4 of Al, and a second insulating layer 5 of $SiO_2$. Pixel electrodes 6 of Al doped with 4% Cu are provided on the second insulating layer 5. A liquid crystal unit 7 with a TN liquid crystal material lies on the pixel electrodes 6. A top electrode 8 of ITO and a front plate 9 of glass thereon are provided on the liquid crystal unit 7. Each pixel electrode 6 is connected to a transistor 2 via a contact hole 10 which is filled with Al. The wall of each contact hole 10 is covered with a 100 nm thick layer of $SiO_2$.

Three such liquid crystal light modulators were used for the construction of a color projection device which yielded an improved picture.

Embodiment 2

A first insulating layer 3 of $Si_3N_4$ was deposited on a semiconducting substrate 1 comprising p-doped silicon for the purpose of manufacturing a liquid crystal light modulator. Transistor arrays and control circuits were present on the semiconducting substrate. A few transistors 2 were exposed at regular distances by means of plasma etching. Then a light-reflecting layer 4 of Al and thereon a second insulating layer 5 of $Si_3N_4$ were deposited. Subsequently, a cylindrical hole 12 was made through the second insulating layer 5, the light-reflecting layer 4, and the first insulating layer 3 by means of plasma etching in those locations where later a pixel electrode 6 was to be connected to a transistor 2. In the next step, a 100 nm thick, third insulating layer 11 of $Si_3N_4$ was deposited on the second insulating layer 5 and on the wall and bottom of the cylindrical hole 12. Those regions of the third insulating layer 11 which lay on the second insulating layer 5 and on the bottom of the cylindrical hole 12 were etched away by means of sputtering. The third insulating layer 11 on the wall of the cylindrical hole 12 served as a natural mask for the etching process here. Then a layer 13 of Al was deposited over the surface of the second insulating layer 5 and in the cylindrical hole 12. The Al was subsequently removed from the second insulating layer 5, and a planar surface was created. Then a layer of Al doped with 4% Cu was deposited and was structured into pixel electrodes 6 by means of plasma etching. Structuring of this layer of reflecting metal was achieved such that subsequently each pixel electrode 6 was connected to a transistor 2 via a contact hole 10. Then a liquid crystal unit 7 with a TN liquid crystal material and a front plate 9 comprising a transparent cover electrode 8 of ITO were provided.

Three such liquid crystal light modulators were used for the construction of a color projection device which yielded an improved picture.

What is claimed is:

1. A projection device fitted with a liquid crystal light modulator which comprises, a semiconducting substrate (1) on which transistor arrays and control circuits are provided, a first insulating layer (3) provided physically upon the substrate (1), a light-reflecting layer (4) provided physically upon the first insulating layer (3) opposite the substrate (1), a second insulating layer (5) provided physically upon the light-reflecting layer (4) opposite the first insulating layer (3), at least two pixel electrodes (6) provided physically upon the second insulating layer (5) opposite the light-reflecting layer (4), wherein each pixel electrode (6) is physically connected to a transistor (2) through a contact hole (10) which is filled with an electrically conducting material, and wherein the wall of the contact hole (10) is fully covered with a third insulating layer (11) such that the contact hole (10) is insulated from physically contacting the first insulating layer (3), the light-reflecting layer (4) or the second insulating layer (5), a liquid crystal unit (7) provided physically upon both the second insulating layer (5) opposite the light-reflecting layer (4) and each pixel electrode (6) opposite the second insulating layer (5), a cover electrode (8) provided physically upon the liquid crystal unit (7) opposite the second insulating layer (5) and each pixel electrode (6), and a front plate (9) provided physically upon the cover electrode (8) opposite the liquid crystal unit (7).

2. A projection device as claimed in claim 1, characterized in that the third insulating layer (11) has a layer thickness of between 100 nm and 500 nm.

3. A projection device as claimed in claim 1, characterized in that the light-reflecting layer (4) has at least one electrical contact to a transistor (2).

4. A liquid crystal modulator which comprises, a semiconducting substrate (1) on which transistor arrays and control circuits are provided, a first insulating layer (3) provided physically upon the substrate (1), a light-reflecting layer (4) provided physically upon the first insulating layer (3) opposite the substrate (1), a second insulating layer (5) provided physically upon the light-reflecting layer (4) opposite the first insulating layer (3), at least two pixel electrodes (6) provided physically upon the second insulating layer (5) opposite the light-reflecting layer (4), wherein each pixel electrode (6) is physically connected to a transistor (2) through a contact hole (10) which is filled with an electrically conducting material, and wherein the wall of the contact hole (10) is fully covered with a third insulating layer (11) such that the contact hole (10) is insulated from physically contacting the first insulating layer (3), the light-reflecting layer (4) or the second insulating layer (5), a liquid crystal unit (7) provided physically upon both the second insulating layer (5) opposite the light-reflecting layer (4) and each pixel electrode (6) opposite the second insulating layer (5), a cover electrode (8) provided physically upon the liquid crystal unit (7) opposite the second insulating layer (5) and each pixel electrode (6), and a front plate (9) provided physically upon the cover electrode (8) opposite the liquid crystal unit (7).

5. A method of manufacturing a liquid crystal modulator which comprises, depositing a semiconducting substrate (1) with transistor arrays and control circuits thereon, depositing a first insulating layer (3) physically upon the substrate (1), depositing a light-reflecting layer (4) physically upon the first insulating layer (3) opposite the substrate (1), depositing a second insulating layer (5) physically upon the light-reflecting layer (4) opposite the first insulating layer (3), providing at least two pixel electrodes (6) physically upon the second insulating layer (5) opposite the light-reflecting layer (4), wherein each pixel electrode (6) is physically connected to a transistor (2) through a contact hole (10) which is filled with an electrically conducting material, and fully covering the wall of the contact hole (10) with a third insulating layer (11) such that the contact hole (10) is insulated from physically contacting the first insulating layer (3), the light-reflecting layer (4) or the second insulating layer (5), depositing a liquid crystal unit (7) physically upon both the second insulating layer (5) opposite the light-reflecting layer (4) and each pixel electrode (6) opposite the second insulating layer (5), depositing a cover electrode (8) physically upon the liquid crystal unit (7) opposite the second insulating layer (5) and each pixel electrode (6), and depositing a front plate (9) physically upon the cover electrode (8) opposite the liquid crystal unit (7).

6. A method as claimed in claim 5, characterized in that the third insulating layer (11) is provided on the wall of the contact hole (10) through deposition of the third insulating layer (11) on the second insulating layer (5) and on the wall as well as on the bottom of the contact hole (10), and in that those regions of the third insulating layer (11) which lie on the second insulating layer (5) and on the bottom of the contact hole (10) are etched away, for which the third insulating layer (11) on the wall of the contact hole (10) serves as a mask.

7. A method as claimed in claim 5, characterized in that at least one transistor (2) is exposed through etching before the light-reflecting layer (4) is deposited.

* * * * *